(12) United States Patent
Tse et al.

(10) Patent No.: US 7,307,839 B2
(45) Date of Patent: Dec. 11, 2007

(54) AIR VENTILATION COOLING SYSTEMS FOR A PORTABLE POWER DEVICE

(75) Inventors: Man Keung Tse, Yeun Long N.T. (HK); Wing Ling Cheng, Tai Po N.T. (HK); Shu Chung Wong, Kowloon (HK)

(73) Assignee: Astec International Limited, Kwun Tong (HK)

( * ) Notice: Subject to any disclaimer, the term of this patent is extended or adjusted under 35 U.S.C. 154(b) by 193 days.

(21) Appl. No.: 10/824,883

(22) Filed: Apr. 14, 2004

(65) Prior Publication Data

US 2005/0231908 A1   Oct. 20, 2005

(51) Int. Cl.
    *H05K 7/20*   (2006.01)
(52) U.S. Cl. .................. 361/695; 361/690; 361/694
(58) Field of Classification Search ............... 361/141, 361/683, 686, 687, 694, 695, 690; 440/12.7; 312/36; 454/184
    See application file for complete search history.

(56) References Cited

U.S. PATENT DOCUMENTS

| | | | | |
|---|---|---|---|---|
| D242,675 S | * | 12/1976 | McNair | D28/38 |
| D255,419 S | * | 6/1980 | Hume | D8/382 |
| D279,283 S | * | 6/1985 | Tate | D13/118 |
| 5,523,917 A | * | 6/1996 | Searby | 361/684 |
| 5,870,284 A | * | 2/1999 | Stewart et al. | 361/699 |
| 5,923,147 A | * | 7/1999 | Martensson | 320/111 |
| 6,213,866 B1 | * | 4/2001 | Impellizzeri | 454/184 |
| 6,307,746 B1 | * | 10/2001 | Beckman | 361/687 |
| 6,325,665 B1 | * | 12/2001 | Chung | 439/501 |
| 6,618,248 B1 | * | 9/2003 | Dalheimer | 361/687 |
| 6,747,871 B2 | * | 6/2004 | Jeudi | 361/695 |
| D502,913 S | * | 3/2005 | Fukami et al. | D13/108 |
| 6,926,130 B2 | * | 8/2005 | Skowronski | 191/12.2 R |
| 2004/0150944 A1 | * | 8/2004 | Byrne et al. | 361/683 |
| 2005/0155830 A1 | * | 7/2005 | Huang | 191/12.2 R |
| 2005/0162832 A1 | * | 7/2005 | Muller et al. | 361/699 |

OTHER PUBLICATIONS

"Definition of vane—Merriam-Webster Online Dictionary"; http://www.m-w.com/dictionary/vane.*

* cited by examiner

*Primary Examiner*—Lisa Lea-Edmonds
*Assistant Examiner*—Anthony M. Haughton
(74) *Attorney, Agent, or Firm*—Nixon Peabody LLP

(57) ABSTRACT

A system that, in a natural convection embodiment, comprises a structure having an output cord and a stand coupled thereto for mounting a power module in a substantially vertical orientation. The stand has a base with a first vertical piece extending therefrom to a first fin that is parallel to the base and having a second vertical piece extending from the base to a second fin that is parallel to the base. The power module plugging into the stand defines a first gap along an edge of the first fin adjacent to the first side of the power module and defines a second gap along an edge of the second fin adjacent to the second side of the power module. The stand allows vertical heat dissipation generated by the power module with air flow vertically through the first and second gaps. Alternatively, an air fan is included for forced convention.

20 Claims, 6 Drawing Sheets

AIR VENTILATION COOLING SYSTEMS FOR A PORTABLE POWER DEVICE

BACKGROUND OF THE INVENTION

1. Field of Invention

The present invention relates generally to power supplies and more particularly to air ventilation cooling systems for a portable power device.

2. Description of Related Art

Portable power devices, such as power converters and fuel cells, can become very hot when used for an extended period of time. In a portable power device, which is typically rectangular, heat is transferred through all side surfaces of the device except for the largest bottom surface. The bottom surface in a conventional portable power device is an ineffective surface for the purpose of heat dissipation.

One conventional solution provides a portable power device with an external enclosure in which a number of open air vents exist on the top and bottom covers. Another conventional solution provides an external enclosure that supports an inner thermally conductive enclosure with a gap between them to facilitate ventilation. These ventilation constructions, however, possess several disadvantages. First, liquid may enter into a sealed enclosure through openings on the top of the enclosure. Second, the temperature rise inside of an enclosure needs to create sufficient pressure difference to generate air movement. Third, spaces that are utilized for air passages may reduce the overall package usable volume as well as increase the thermal resistance to ambient.

Accordingly, there is a need for an air ventilation cooling structure for a portable power device that produces a more efficient heat dissipation effect.

SUMMARY OF THE INVENTION

The present invention overcomes the foregoing limitations by providing air ventilation cooling systems for a portable power device. Each air ventilation system comprises a cord stand in a structure that allows efficient heat dissipation generated from a power module. In a first aspect of the invention, a portable power device with natural convection for heat transfer is disclosed. In a second aspect of the invention, a portable power device with forced convection for heat transfer is disclosed.

Broadly stated, a portable power device in a natural convection mode, according to the present invention, comprises an output cord; and a stand, coupled to the output cord, for mounting a power module in a substantially vertical orientation, the stand having a base with a first vertical piece extending from the base to a first fin that is parallel to the base and having a second vertical piece extending from the base to a second fin that is parallel to the base, the power module plugging into the stand for creating a first gap along an edge of the first fin that is adjacent to the a first side of the power module and creating a second gap along an edge of the second fin that is adjacent to the second side of the power module, the stand allowing vertical heat dissipation generated by the power module with air flow vertically through the first and second gaps.

Advantageously, the present invention significantly improves the heat dissipation of portable power devices. Moreover, the present invention increases the power density in the portable power devices.

Other structures and methods are disclosed in the detailed description below. This summary does not purport to define the invention. The invention is defined by the claims. These and other embodiments, features, aspects, and advantages of the invention will become better understood with regard to the following description, appended claims and accompanying drawings.

Reference symbols or names are used in the Figures to indicate certain components, aspects or features therein, with reference symbols common to more than one Figure indicating like components, aspects or features shown therein.

DETAILED DESCRIPTION OF PREFERRED EMBODIMENTS

Figure 1A:
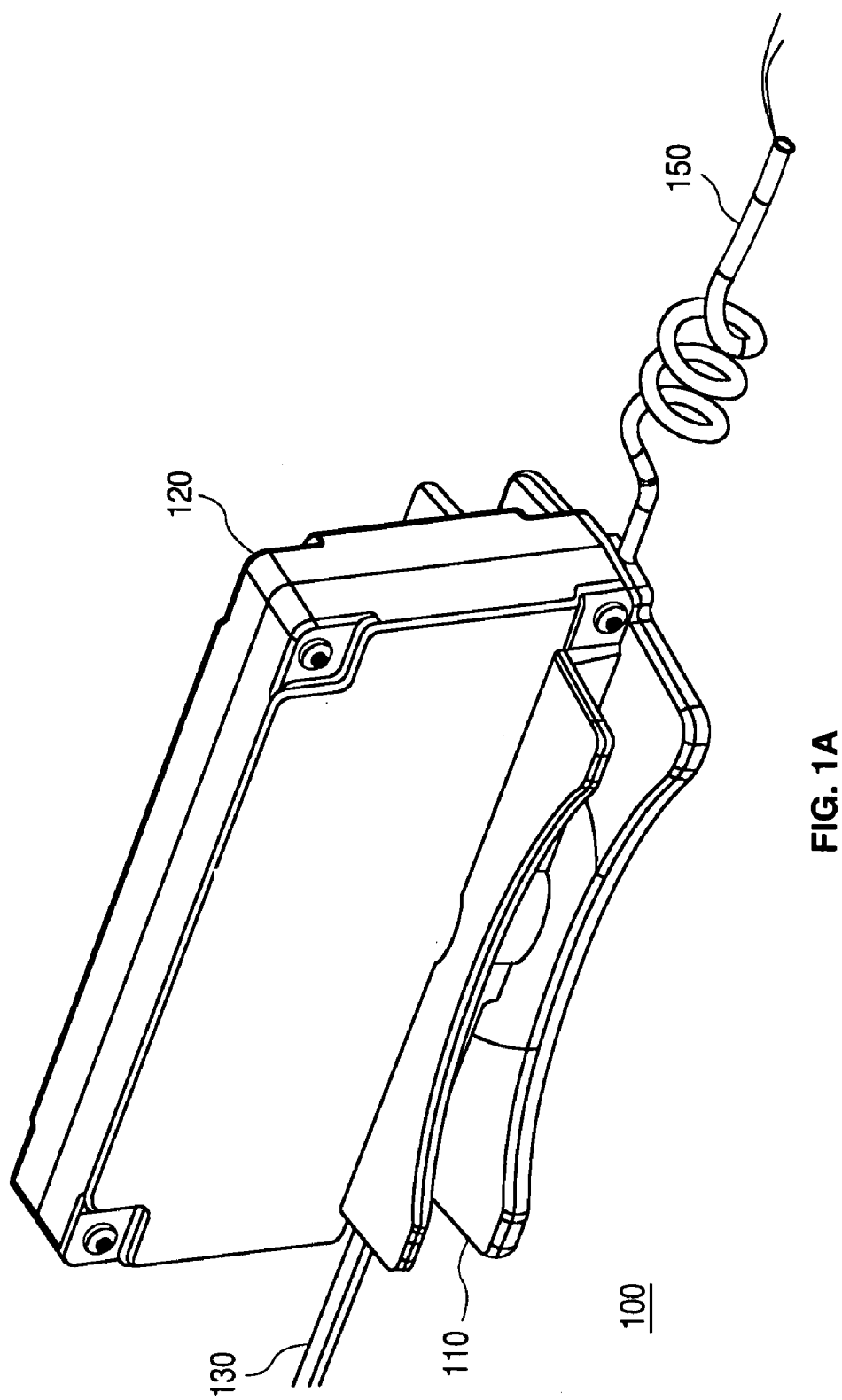
FIG. 1A is a structural diagram illustrating a natural convection cooling structure including a stand for mounting a power module in accordance with the present invention.
Figure 1B:
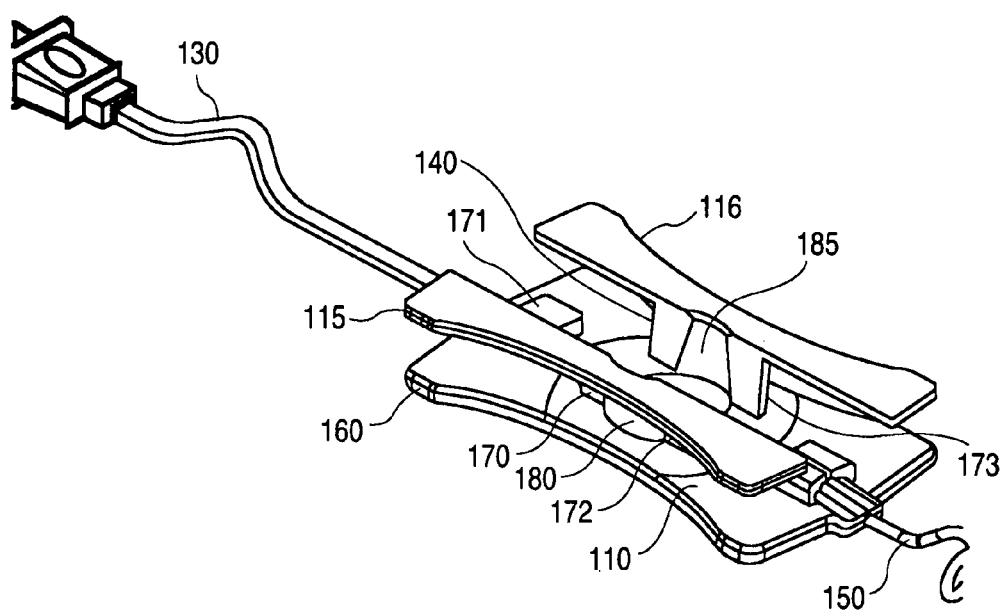
FIG. 1B is a pictorial diagram illustrating the stand shown in FIG. 1A with the power module disconnected from the stand.
Figure 2:
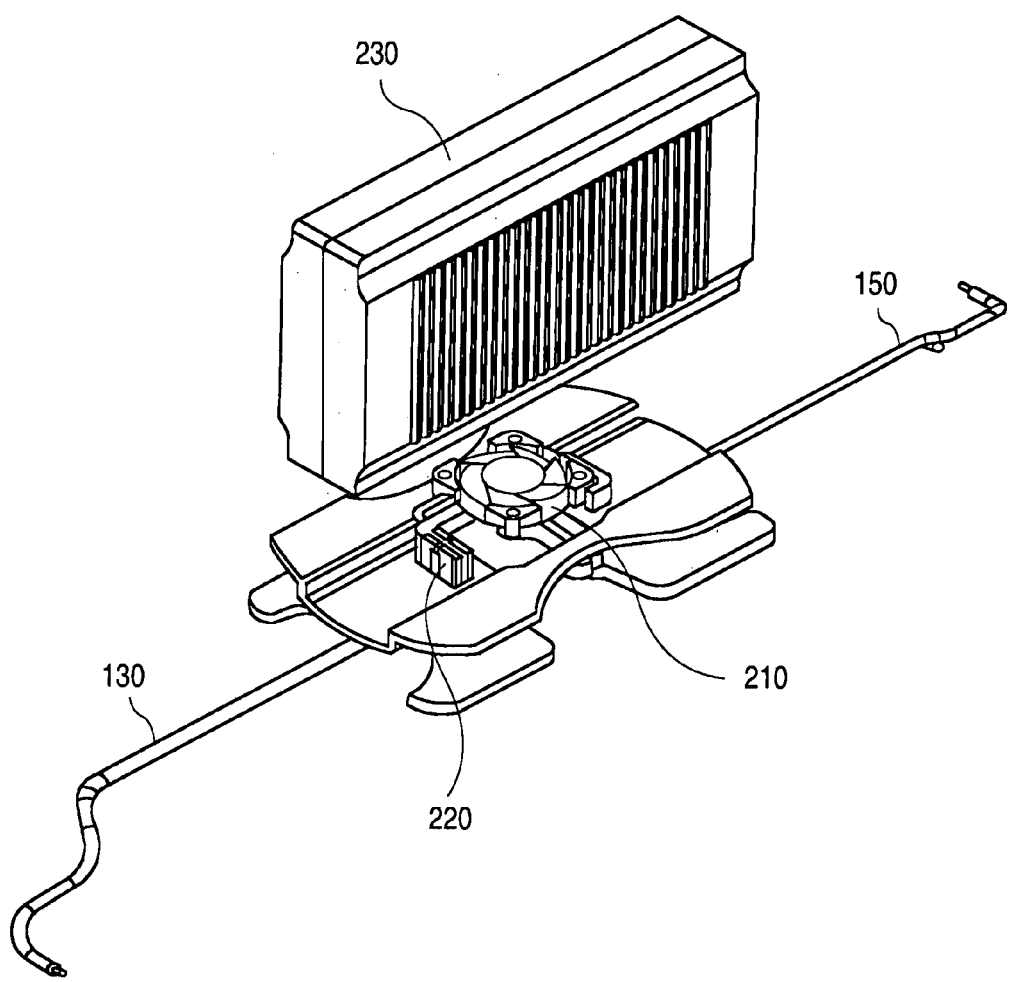
FIG. 2 is an exploded perspective view of one embodiment of a forced convection cooling structure in accordance with the present invention.
Figure 3:
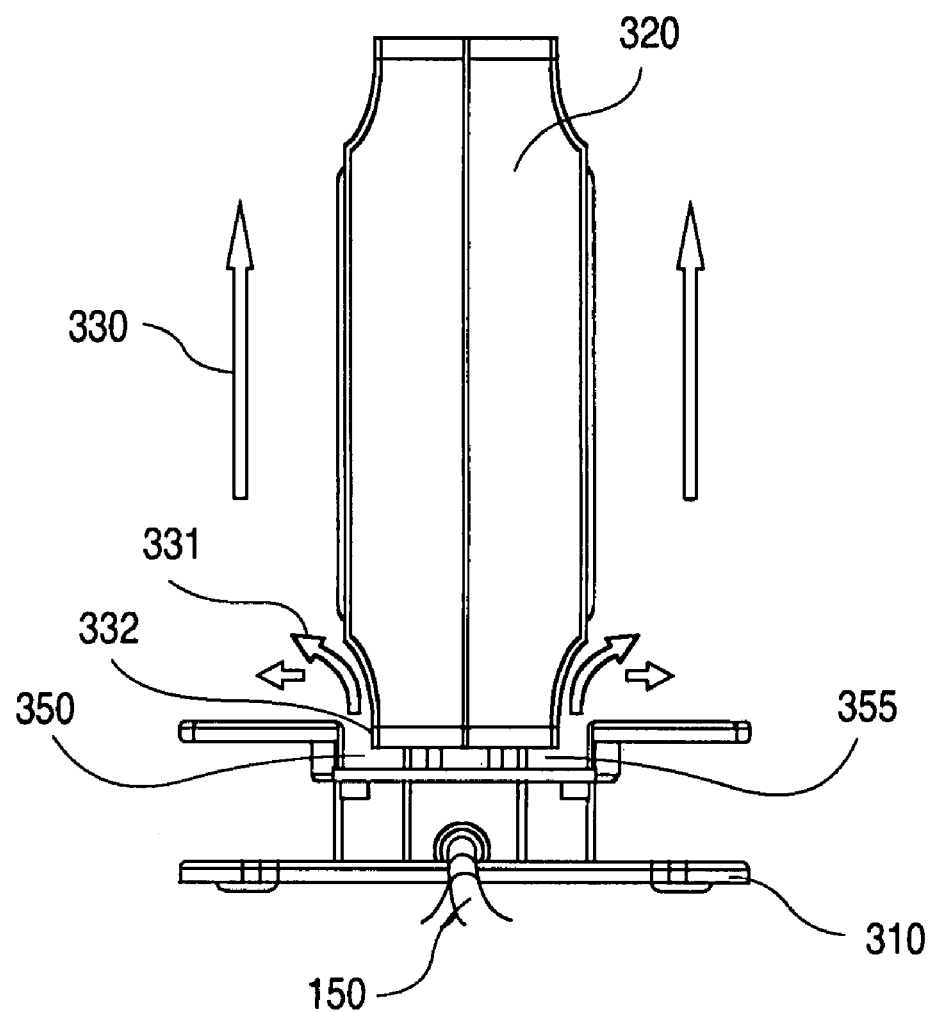
FIG. 3 is a pictorial diagram illustrating a side view of the forced convection cooling structure shown in FIG. 2 in accordance with the present invention showing the path of air flow.

Referring now to FIG. 1A, there is shown a structural diagram illustrating a natural convection cooling structure 100 including a stand for mounting a power module. The natural cooling structure 100 comprises a stand 110 and a power module 120 where the power module 120 is plugged into the stand 110. The stand 110 includes one or more standardized connectors or sockets 220 (as shown in FIG. 2). Connectors 220 preferably serve as the support for power module 120. Power module 120 includes corresponding connectors or sockets (not shown) that enable the power module 120 to plug into the one or more connectors or sockets 220 of the stand 110. FIG. 1B is a pictorial diagram illustrating the stand shown in FIG. 1A with the power module disconnected from the stand. The standardized connectors and sockets include an output power cord 150 and, where the power module 120 is a power conversion device, an input power cord 130. Input power cord 130 can be either an AC power cord or a DC cord to accommodate different operating environments. The stand 110 has a pair of fins, a first fin 115 and a second fin 116. The first fin 115 and the second fin 116 are preferably shaped with an arc to increase the rate of heat dissipation. The stand 110 is coupled to the output cord 150 and preferably is arranged to mount the power module 120 in a substantially vertical orientation. The stand 110 has a base 160 with a first vertical piece 170 extending from the base 160 to the first fin 115 that extends out from the module 120 preferably in a direction parallel to the base 160, and a second vertical piece 171 extending from the base 160 to the second fin 116 that extends out from the module 120 preferably in a direction opposite to said first fin 115 in a direction parallel to the base 160. When the power module 120 is plugged into the stand 110, a first gap 350 is created (see FIG. 3) along an edge of the first fin 115 that is adjacent to the first side of the power module 120 or 320, and a second gap 355 is created (see FIG. 3) along an edge of the second fin 116 that is adjacent to the second side of the power module 120 or 320. The stand 110 allows vertical heat dissipation generated by the power module 120 or 320 with air flow vertically through the first gap 350 and the second gap 355, as shown in FIG. 3. Moreover, the stand 110 preferably includes a third vertical piece 172 extending from the base 160 to the first fin 115, and a fourth vertical piece 173 extending from the base 160 to the second fin 116, such that the first and third vertical pieces 170, 172 form a first vanes-shaped configuration with an opening 180 between the first and third vertical pieces 170, 172 and such that the second and fourth vertical pieces 171, 173 form a second vanes-shaped configuration with an opening 185 between the second and fourth vertical pieces.

In addition, where the power module is a power conversion device, the stand 110 includes an input power cord 130 in addition to the output power cord 150. Optionally, the stand 110 can include a spool 140 for winding and unwinding of the input power cord 130 and/or the output power cord 150. When the stand 110 is not in use, the spool 140 can wind up the input power cord 130. When the stand 110 is in use, the spool 140 can unwind the input power cord 130 for extending the input power cord 130 a selected length. Preferably, the stand 110 is made of a thermally conductive material, such as metal, or a high thermal conductivity plastic, e.g., "Coolpolymer", "RTP", or other type of high thermally conductivity polymer. The thermal conductivity such polymers can be as high, for example, as 3 W/m° K or above.

FIG. 2 is an exploded perspective view of one embodiment of a forced convection cooling structure 200. The forced convection cooling structure 200 has a replaceable forced air fan 210 on top of a stand 220 with a built-in male or female connector. A power module 230 with a build-in connector is connected to the build-in female connector of the cord stand 220. One of ordinary skill in the art should recognize that a different combination of connectors or sockets can be practiced without departing from the spirit of the present invention.

FIG. 3 is a pictorial diagram illustrating a side view of the forced convection cooling structure shown in FIG. 2 in accordance with the present invention showing the path of air flow. The forced convection cooling structure 300 comprises a stand 310, a power module or fuel cell 320, and an air fan (as shown in FIG. 2) centrally located on the stand 130. To dissipate the heat from the power module 320, the air fan in stand 310 pushes the air flow 330 vertically from the stand 310 upward, pushes the air flow 332 horizontally above the stand 310, and pushes the air flow 331 angularly outward away from the center of the cord stand.

Figure 4:
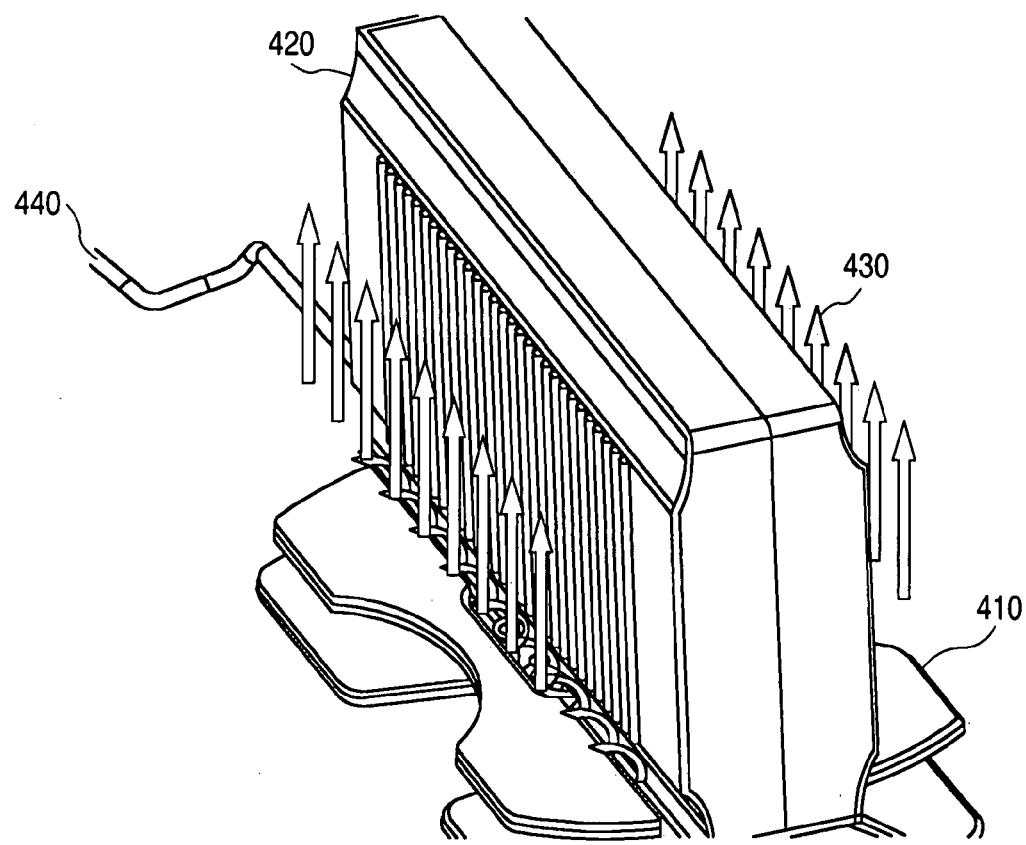
FIG. 4 is a pictorial diagram illustrating a perspective view of the forced convection cooling structure using a fuel cell energy generating unit in accordance with the present invention.

Turning now to FIG. 4, there is shown a pictorial diagram illustrating a perspective view of the forced convection cooling structure 400 that includes a fuel cell energy generating unit 410. The forced convection cooling structure 400 comprises the cell energy generating unit 410 and a stand 420. The cell energy generating unit 410 does not need an input cord for connecting to a power source, but rather there is just an output cord 440 extending from the cell energy generating unit 410. Similar to the forced convection cooling structure 300 in FIG. 3, the cord stand 410 generates air flow 430 vertically from the cord stand 410 upward for dissipating the heat produced by the fuel cell energy generating unit 420.

Figure 5:
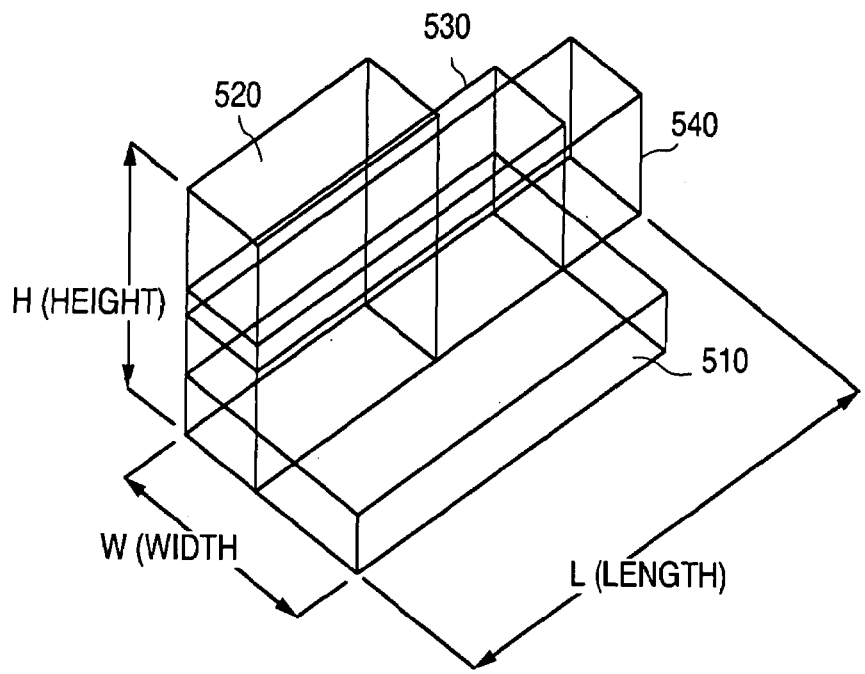
FIG. 5 is a pictorial diagram illustrating heat transfer principles in a three-dimensional structure in accordance with the present invention.

In FIG. 5, there is shown a pictorial diagram illustrating heat transfer principles in a three-dimensional structure 500. The three-dimensional structure 500 comprises a first rectangular prism 510, a second rectangular prism 520, a third rectangular prism 530 and a fourth rectangular prism 540. Each of the first, second, third and fourth rectangular prisms 510, 520, 530 and 540 contains the same volume but with a different aspect ratio. Each is shown resting on a thermally insulating surface. The first rectangular prism 510 extends horizontally with one of the largest surfaces facing downward, the second rectangular prism 520 extends vertically with one of the smallest surfaces facing downward, and the third rectangular prism 530 extending vertically with one of the smaller surface facing downward. The fourth rectangular prism 540 contains the same volume as the first, second and third rectangular prisms 510, 520 and 530 but with a different aspect ratio. The amount of heat dissipation to the ambient varies as the aspect ratio changes. Although a longer rectangular prism is desirable, a rectangular prism that extends the longest is not suitable for components layout as well as the ease of portability.

Figure 6:
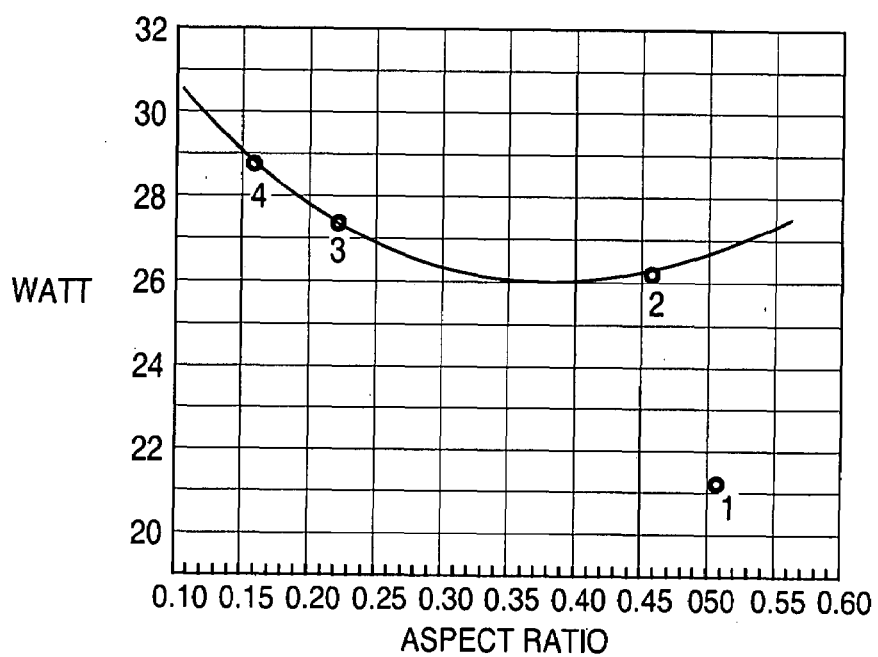
FIG. 6 is a graph illustrating a sample curve showing heat dissipation verses ambient with different aspect ratios in accordance with the present invention.

As an illustration, FIG. 6 is a graph showing a sample curve of heat dissipation verses ambient with different aspect ratios. In this example, the graph shows the thermal handling capacity for a 50 degree C. hot spot surface temperature. While the first rectangular prism 510 has a horizontally-oriented shape, the second rectangular prism 520, the third rectangular prism 530, and the fourth rectangular prism 540 are in a vertically-oriented shape. A vertically-oriented rectangular prism has been found to provide a larger amount of power dissipation. Therefore, a vertical ventilation system is a more optimal ventilation structure than a horizontal ventilation system for dissipating heat generated from a power module.

Those skilled in the art can now appreciate from the foregoing description that the broad techniques of the embodiments of the present invention can be implemented in a variety of forms. For example, one of ordinary skill in the art should recognize that a power module can include a power conversion device, a power generator, or a fuel cell energy generator. In addition, the cord stand can be designed in various configurations, such as a vanes-shape structure. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. An air ventilation structure for a portable power device in a natural convection mode, comprising:

an output cord; and a stand, coupled to the output cord, for mounting a power module in a substantially vertical orientation, the stand having a base with a first vertical piece extending from the base to a first fin that extends substantially along the entire length of the stand and extends out from the base away from said module in a first direction, and having a second vertical piece extending from the base to a second fin that extends substantially along the entire length of the stand and extends out from the base away from said module in a second direction, the power module plugging into the stand defining a first gap along an edge of the first fin that is adjacent to the first side of the power module and extends substantially along the entire length of the stand and defining a second gap along an edge of the second fin that is adjacent to the second side of the power module and extends substantially along the entire length of the stand, the stand allowing vertical heat dissipation generated by the power module with air flow vertically through the first and second gaps and along respective substantially vertical surfaces of said power module.

2. The air ventilation structure of claim 1, wherein the stand comprises a third vertical piece extending from the base to the first fin, a fourth vertical piece extending from the base to the second fin, the first and third vertical pieces forming a first vane with an opening between the first and third vertical pieces, the second and fourth vertical pieces forming a second vane with an opening between the second and fourth vertical pieces.

3. The air ventilation structure of claim 1, wherein the stand comprises a male socket, the power module having a female socket connected to the male socket of the stand.

4. The air ventilation structure of claim 1, wherein the stand comprises a female socket, the power module having a male socket connected to the female socket of the stand.

5. The air ventilation structure of claim 1, wherein the stand having a reel section for winding and unwinding of an input power cord.

6. The air ventilation structure of claim 1, wherein the base of the stand has a footprint that provides stability for vertically mounting the power module.

7. The air ventilation structure of claim 1, wherein the power module comprises a power converter.

8. The air ventilation structure of claim 1, wherein the power module comprises a power generator.

9. The air ventilation structure of claim 1, wherein the power module comprises a fuel cell energy generator.

10. The air ventilation structure of claim 1, further comprising an input power cord coupled to the stand.

11. The air ventilation structure of claim 1, wherein the power module comprises a power converter, a power generator, or a fuel cell energy generator.

12. An air ventilation structure for a portable power device in a forced convection mode with a replaceable air fan, comprising:
an air fan; and
a stand, coupled to the output cord, for mounting a power module in a substantially vertical orientation, the stand having a base with a first vertical piece extending from the base to a first fin that extends substantially along the entire length of the stand and is parallel to the base and having a second vertical piece extending from the base to a second fin that extends substantially along the entire length of the stand and is parallel to the base, the power module plugging into the stand for creating a first gap along an edge of the first fin that is adjacent to the first side of the power module and extends substantially along the entire length of the stand and creating a second gap along an edge of the second fin that is adjacent to the second side of the power module and extends substantially along the entire length of the stand, the stand allowing vertical heat dissipation generated by the power module with the air fan generating air flow vertically through the first and second gaps.

13. The air ventilation structure of claim 12, wherein the air fan is a replaceable unit.

14. The air ventilation structure of claim 12, wherein the air fan is integrated into the stand.

15. The air ventilation structure of claim 12, wherein the stand comprises a third vertical piece extending from the base to the first fin, a fourth vertical piece extending from the base to the second fin, the first and third vertical pieces forming a first vane with an opening between the first and third vertical pieces, the second and fourth vertical pieces forming a second vane with an opening between the second and fourth vertical pieces.

16. The air ventilation structure of claim 12, wherein the stand comprises a male socket, the power module having a female socket connected to the male socket of the stand.

17. The air ventilation structure of claim 12, wherein the stand comprises a female socket, the power module having a male socket connected to the female socket of the stand.

18. The air ventilation structure of claim 12, wherein the stand having a reel section for winding and unwinding of an input power cord.

19. The air ventilation structure of claim 12, wherein the base of the stand has a footprint that provides stability for vertically mounting the power module.

20. The air ventilation structure of claim 12, further comprising an output cord coupled to the stand.

* * * * *